(12) United States Patent
Lee et al.

(10) Patent No.: US 11,070,775 B2
(45) Date of Patent: Jul. 20, 2021

(54) LIGHT MODULATING DEVICE AND ELECTRONIC APPARATUS INCLUDING THE SAME

(71) Applicant: SAMSUNG ELECTRONICS CO., LTD., Suwon-si (KR)

(72) Inventors: Changbum Lee, Seoul (KR); Junghyun Park, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 16/102,939

(22) Filed: Aug. 14, 2018

(65) Prior Publication Data

US 2019/0075275 A1    Mar. 7, 2019

(30) Foreign Application Priority Data

Sep. 5, 2017    (KR) .................. 10-2017-0113350

(51) Int. Cl.
*H04N 9/31* (2006.01)
*G02F 1/29* (2006.01)
(Continued)

(52) U.S. Cl.
CPC ........... *H04N 9/315* (2013.01); *G02B 5/3083* (2013.01); *G02B 26/0833* (2013.01);
(Continued)

(58) Field of Classification Search
CPC .. G02F 1/0126; G02F 1/0147; G02F 2203/15; G02F 1/0121; G02F 1/29; G02F 2203/10; G02F 3/00; G02F 1/015; G02F 1/13; G02F 1/15; G02F 1/1516; G02F 1/153; G02F 1/292; G02F 1/31; G02F 2202/10; G02F 2202/30; G02F 2202/32; G02F 2202/36; G02F 2203/11; G02F 1/00; G02F 1/009; G02F 1/01; G02F 1/011; G02F 1/0136; G02F 1/0333; G02F 1/133362; G02F 1/1347; G02F 1/135; G02F 1/155; G02F 1/3501; G02F 2001/0156;
(Continued)

(56) References Cited

U.S. PATENT DOCUMENTS

2002/0159486 A1    10/2002 Takayama
2005/0083565 A1    4/2005 Yamazaki et al.
(Continued)

FOREIGN PATENT DOCUMENTS

WO    2015/187221 A2    12/2015

OTHER PUBLICATIONS

Lei Kang et al., "Electrically Driven Hybrid Photonic Metamaterials for Multifunctional Control", Proceedings of SPIE, vol. 10345, 103451G, SPIE, XP060092771, Aug. 24, 2017, 10 pages.
(Continued)

*Primary Examiner* — Collin X Beatty
*Assistant Examiner* — Grant A Gagnon
(74) *Attorney, Agent, or Firm* — Sughrue Mion, PLLC

(57) ABSTRACT

A light modulating device includes a metal layer, a variable resistance material layer above the metal layer and having a plurality of resistance states depending on a voltage applied thereto, and a meta surface layer above the variable resistance material layer and including a nano structure comprising a conductive material and having a sub-wavelength dimension.

17 Claims, 18 Drawing Sheets

(51) Int. Cl.
  *G02B 5/30* (2006.01)
  *G02B 26/08* (2006.01)
(52) U.S. Cl.
  CPC .......... *G02F 1/292* (2013.01); *G02F 2202/00* (2013.01); *G02F 2202/30* (2013.01); *G02F 2203/12* (2013.01)
(58) Field of Classification Search
  CPC ............ G02F 2201/30; G02F 2203/02; G02F 2203/13; G02F 2/02; G02F 3/02; G02F 1/0018; G02F 1/0063; G02F 1/0102; G02F 1/0105; G02F 1/0123; G02F 1/0131; G02F 1/017; G02F 1/01725; G02F 1/025; G02F 1/03; G02F 1/0338; G02F 1/132; G02F 1/13342; G02F 1/133514; G02F 1/133516; G02F 1/133611; G02F 1/133617; G02F 1/13439; G02F 1/137; G02F 1/1506; G02F 1/15165; G02F 1/163; G02F 1/17; G02F 1/195; G02F 1/21; G02F 1/353; G02F 1/3534; G02F 2001/0152; G02F 2001/0155; G02F 2001/01741; G02F 2001/133562; G02F 2001/15145; G02F 2001/1552; G02F 2001/1557; G02F 2001/3507; G02F 2201/06; G02F 2201/063; G02F 2201/083; G02F 2201/086; G02F 2201/124; G02F 2201/16; G02F 2203/01; G02F 2203/03; G02F 2203/055; G02F 2203/12; G02F 2203/585; G02F 2203/62; G02B 5/23; G02B 26/02; G02B 1/04; G02B 26/005; G02B 6/1225; G02B 2006/12097; G02B 26/04; G02B 27/1006; G02B 27/1086; G02B 30/56; G02B 5/008; G02B 19/0028; G02B 1/002; G02B 2006/12061; G02B 26/004; G02B 27/0093; G02B 27/14; G02B 5/0284; G02B 5/0294; G02B 5/22; G02B 6/14; G02B 19/0014; G02B 19/0019; G02B 19/0042; G02B 19/0047; G02B 19/0057; G02B 1/00; G02B 1/041; G02B 1/06; G02B 2005/1804; G02B 2006/12035; G02B 2006/12119; G02B 2006/12126; G02B 2006/1215; G02B 2006/12152; G02B 2027/0127; G02B 2027/0138; G02B 2027/014; G02B 2027/0187; G02B 21/0076; G02B 21/0084; G02B 2207/115; G02B 23/00; G02B 26/00; G02B 26/026; G02B 26/08; G02B 26/0833; G02B 26/0841; G02B 27/0018; G02B 27/0075; G02B 27/0101; G02B 27/0905; G02B 27/104; G02B 27/143; G02B 27/283; G02B 27/4244; G02B 30/27; G02B 30/35; G02B 30/54; G02B 30/60; G02B 5/003; G02B 5/005; G02B 5/02; G02B 5/0215; G02B 5/0221; G02B 5/0236; G02B 5/0257; G02B 5/0273; G02B 5/045; G02B 5/0816; G02B 5/124; G02B 5/18; G02B 5/201; G02B 5/223; G02B 5/28; G02B 5/3016; G02B 6/00; G02B 6/0043; G02B 6/005; G02B 6/0208; G02B 6/12; G02B 6/12007; G02B 6/1226; G02B 6/1228; G02B 6/125; G02B 6/126; G02B 6/262; G02B 6/266; G02B 6/2726; G02B 6/2766; G02B 6/2773; G02B 6/29317; G02B 6/29352; G02B 6/32; G02B 6/4226; G02B 7/023; H04N 13/363; H04N 13/398; H04N 5/2256; H04N 13/302; H04N 13/32; H04N 13/322; H04N 13/346; H04N 13/351; H04N 13/39; H04N 1/32144; H04N 1/32309; H04N 2005/7466; H04N 21/8358; H04N 2201/3233; H04N 5/2254; H04N 5/2354; H04N 5/7458; H04N 7/183; H04N 9/045; H04N 9/315; H04N 9/317
  USPC ....................................................... 359/244
  See application file for complete search history.

(56) References Cited

U.S. PATENT DOCUMENTS

| 2005/0128029 | A1 | 6/2005 | Lee et al. |
| 2012/0013962 | A1 | 1/2012 | Subbaraman et al. |
| 2016/0025914 | A1 | 1/2016 | Brongersma et al. |
| 2017/0153528 | A1 | 6/2017 | Kim et al. |
| 2017/0176651 | A1 | 6/2017 | Lee et al. |

OTHER PUBLICATIONS

Communication dated Jan. 16, 2019, issued by the European Patent Office in counterpart European Application No. 18191418.5.

L. Zhao et al. "Multi-level control of conductive nano-filament evolution in $HfO_2$ ReRAM by pulse-train operations" Royal Society of Chemistry, vol. 6, 2014 (pp. 5698-5702).

Kim Ngoc Pham et al. "$TiO_2$ thin film based transparent flexible resistive switching random access memory" Advanced in Natural Sciences: Nanoscience and Nanotechnology, vol. 7, 2016 015017 (3pp) (4 pages total).

LIGHT MODULATING DEVICE AND ELECTRONIC APPARATUS INCLUDING THE SAME

CROSS-REFERENCE TO RELATED APPLICATION

This application claims priority from Korean Patent Application No. 10-2017-0113350, filed on Sep. 5, 2017, in the Korean Intellectual Property Office, the disclosure of which is incorporated herein in its entirety by reference.

BACKGROUND

1. Field

Apparatuses consistent with exemplary embodiments relate to a light modulating device for modulating incident light.

2. Description of the Related Art

Optical elements that change the transmission, reflection, polarization, phase, intensity, path, and the like of incident light are utilized in various different types of optical devices. In addition, light modulators having any of various different structures have been proposed so as to control the above characteristics in a desired manner in an optical system.

For example, liquid crystals having optical anisotropy, microelectromechanical system (MEMS) structures using the micromechanical movement of a light blocking and reflecting element, and the like are widely used in light modulators. Such light modulators have a slow operation response time of about several microseconds ($\mu$s) or more due to the characteristics of the driving methods thereof.

Recently, there has been an attempt to apply a meta structure to a light modulator. A meta structure is a structure having to a thickness, a pattern, a period, or the like with a dimension that is less than a wavelength of incident light. In order to modulate light, performance such as an increase in a range of phase modulation and ease of adjustment is required.

SUMMARY

One or more exemplary embodiments may provide light modulating devices capable of modulating light in various ways by forming a desired phase profile.

Additional exemplary aspects and advantages will be set forth in part in the description which follows and, in part, will be apparent from the description, or may be learned by practice of the presented exemplary embodiments.

According to an aspect of an exemplary embodiment, a light modulating device includes: a metal layer; a variable resistance material layer above the metal layer and having a plurality of resistance states depending on a voltage applied thereto; and a meta surface layer above the variable resistance material layer and including a nano structure having a sub-wavelength dimension and a conductive material.

The variable resistance material layer may be a material that forms conductive nano-filaments by a voltage applied thereto.

The variable resistance material layer may include a material that adjusts a number of conductive nano-filaments by a voltage applied thereto.

The variable resistance material layer may include $MO_x$ (where M is Ni, Ta, Ni, Hf, Fe, W, Mn, or Co and x is real number).

A low resistance region including M and a high resistance region including $MO_x$ may be formed in the variable resistance material layer by a voltage applied thereto.

An area of the low resistance region may be adjusted by a voltage applied thereto.

The variable resistance material layer may directly contact the metal layer.

The meta surface layer may include a plurality of conductive nano-antennas having a sub-wavelength dimension of.

The plurality of conductive nano-antennas may directly contact the variable resistance material layer.

The metal layer may include a plurality of metal lines which extend, lengthwise, in a first direction and are repeatedly arranged and spaced apart from each other in a second direction intersecting with the first direction.

The plurality of conductive nano-antennas may be two-dimensionally arranged in the first direction and the second direction, and the conductive nano-antennas which are adjacent to each other in the second direction, from among the plurality of conductive nano-antennas, may be connected to each other, repeatedly arranged and spaced apart from each other in the first direction, to form a plurality of conductive nano-antenna lines.

The variable resistance material layer may be partitioned into a plurality of pixels two-dimensionally arranged and spaced apart from each other in the first direction and the second direction, and the plurality of pixels may be arranged at positions at which the plurality of metal lines and the plurality of conductive nano-antenna lines intersect with each other.

The light modulating device may further include: a first signal controller configured to control an electrical signal applied to each of the plurality of metal lines; and a second signal controller configured to control an electrical signal applied to each of the plurality of conductive nano-antenna lines.

The meta surface layer may include: a conductive material layer; and a plurality of dielectric nano-antennas above the conductive material layer and having a sub-wavelength dimension of.

The conductive material layer may directly contact the variable resistance material layer.

The metal layer may include a plurality of metal lines that extend, lengthwise, in a first direction and are repeatedly arranged and spaced apart from each other in a second direction intersecting with the first direction.

The conductive material layer may include a plurality of conductive lines that extend, lengthwise, in the second direction and are repeatedly arranged and spaced apart from each other in the first direction.

The variable resistance material layer may be partitioned into a plurality of pixels two-dimensionally arranged and spaced apart from each other in the first direction and the second direction, and the plurality of pixels may be arranged at positions at which the plurality of metal lines and the plurality of conductive lines intersect with each other.

The light modulating device may further include: a first signal controller configured to control an electrical signal applied to each of the plurality of metal lines; and a second signal controller configured to control an electrical signal applied to each of the plurality of conductive lines.

According to an aspect of another exemplary embodiment, a Light Detection and Ranging (lidar) apparatus includes: a light source; any one of the light modulating devices configured to steer light from the light source to an object; and a sensor configured to receive light which is steered by the light modulating device and reflected from the object after irradiation on the object.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
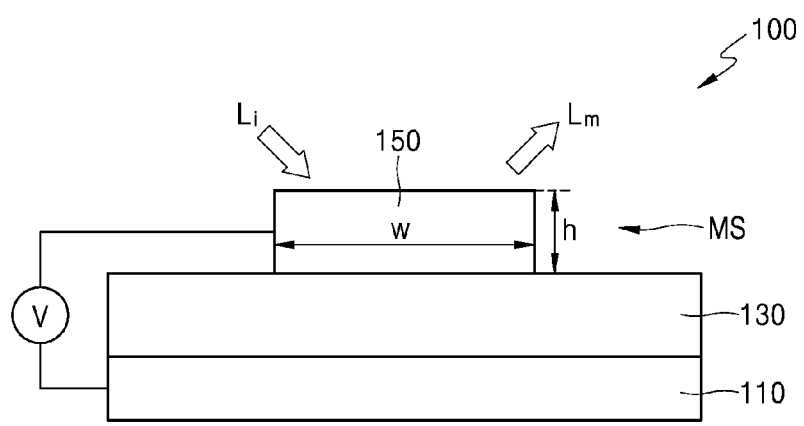
FIG. 1 is a cross-sectional view illustrating a schematic configuration of a light modulating device according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when a layer, region, or component is referred to as being "formed on," another layer, region, or component, it can be directly or indirectly formed on the other layer, region, or component.

It will be understood that, although the terms "first", "second", etc. may be used herein to describe various elements, these elements should not be limited by these terms. These terms are only used to distinguish one element from another.

As used herein, the singular forms "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

Also, the terms "unit" and "module" as used herein represent a unit for processing at least one function or operation, which may be implemented by hardware, software, or a combination of hardware and software.

Figure 2A:
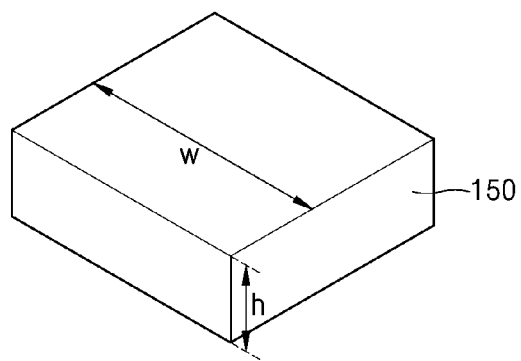
FIGS. 2A, 2B, and 2C illustrate exemplary shapes of a conductive nano-antenna included in the light modulating device of FIG. 1.
Figure 2B:
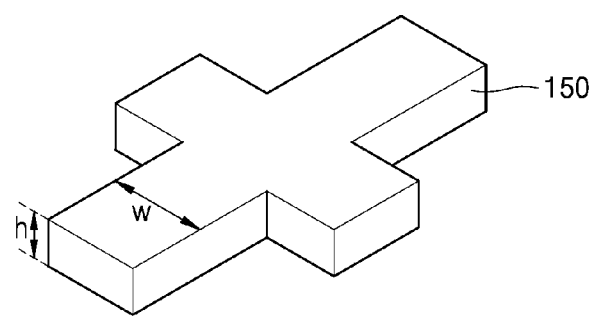
Figure 2C:
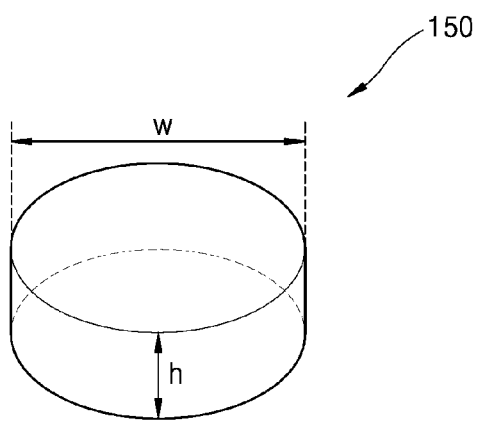

FIG. 1 is a cross-sectional view illustrating a schematic configuration of a light modulating device 100 according to an exemplary embodiment. FIGS. 2A, 2B, and 2C illustrate exemplary shapes of a conductive nano-antenna 150 included in the light modulating device 100 of FIG. 1.

The light modulating device 100 modulates incident light $L_i$ and outputs modulated light $L_m$. The light modulating device 100 includes a metal layer 110, a variable resistance material layer 130 above the metal layer 110, and a meta surface layer MS above the variable resistance material layer 130.

The meta surface layer MS includes a plurality of conductive nano-antennas 150, each having a sub-wavelength dimension. For convenience, one conductive nano-antenna 150 is illustrated in the drawings. A sub-wavelength dimension is a dimension that is less than a wavelength of the incident light $L_i$ to be modulated by the light modulating device 100. With respect to the conductive nano-antenna 150, for example, at least one of a width w and a thickness h, may be less than the wavelength of the incident light $L_i$.

The conductive nano-antenna 150 may take any of various shapes, so long as the shape includes a sub-wavelength dimension. The conductive nano-antenna 150 may take the shape of a cylinder, an elliptic cylinder, or a polyprism shape, and may have an asymmetric shape.

The conductive nano-antenna 150 may have a square prism shape with a square cross-section as illustrated in FIG. 2A, or may have a prism shape with a cross-shaped cross-section as illustrated in FIG. 2B. Alternatively, the conductive nano-antenna 150 may have a cylindrical shape as illustrated in FIG. 2C. The conductive nano-antenna 150 is not limited to the illustrated shapes, and exemplary embodiments of the present disclosure are not limited thereto.

As a conductive material for forming the conductive nano-antenna 150, a high-conductivity metal material capable of causing surface plasmon excitation may be employed. For example, the conductive nano-antenna 150 may include at least one selected from copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or may include an alloy including any one of these. Also, the conductive nano-antenna 150 may include a high-conductivity two-dimensional material, such as graphene, or a conductive oxide.

The conductive nano-antenna 150 may modulate the phase of light having a predetermined wavelength band. It is known that this function is caused by surface plasmon resonance occurring at an interface between a conductive material and a dielectric material. The degree of phase modulation and the resonance wavelength may be controlled by controlling the detailed shape of the conductive nano-antenna 150 and the refractive index of the variable resistance material layer 130.

The variable resistance material layer 130 may include a material having a plurality of resistance states depending on a voltage applied thereto. The variable resistance material layer 130 has a different refractive index in each of the plurality of resistance states, which influences the behavior of the conductive nano-antenna 150. That is, the degree to which the light modulating device 100 modulates the phase of the incident light $L_i$ may be controlled by controlling the resistance state of the variable resistance material layer 130.

The variable resistance material layer 130 may include a material that forms conductive nano-filaments according to a voltage applied thereto. Such a material may be referred to as a nano-filamentary material. The nano-filamentary material is a material that forms conductive nano-filaments when a voltage of a specific value, unique to the material, is applied thereto. The nano-filamentary material may include, for example, $TiO_x$. A state in which the metal layer 110 and the conductive nano-antenna 150 are connected to each other by the conductive nano-filament may be regarded as a low resistance state, and a state in which the metal layer 110 and the conductive nano-antenna 150 are not connected to each other by the conductive nano-filament may be regarded as a high resistance state. The number of low resistance states may be two or more. That is, the number or size of conductive nano-filaments may be controlled according to an applied voltage, thereby providing a plurality of resistance states.

The variable resistance material layer 130 may include a material that forms a low resistance region by a voltage applied thereto. The area of the low resistance region increases according to the applied voltage, and thus, the variable resistance material layer 130 may have a plurality of different resistance states. The variable resistance material layer 130 may include a metal oxide, for example, an oxide of a metal having a plurality of oxidation states. The variable resistance material layer 130 may include $MO_x$, and M may be Ni, Ta, Ni, Hf, Fe, W, Mn, or Co and x is real number.

The metal layer 110 may be used to apply a voltage between the metal layer 110 and the conductive nano-antenna 150, and may function as a mirror layer that reflects light. The metal layer 110 may include any of various metal materials capable of executing such a function, for example, at least one selected from Cu, Al, Ni, Fe, Co, Zn, Ti, Ru, Rh, Pd, Pt, Ag, Os, Ir, and Au.

Figure 3A:
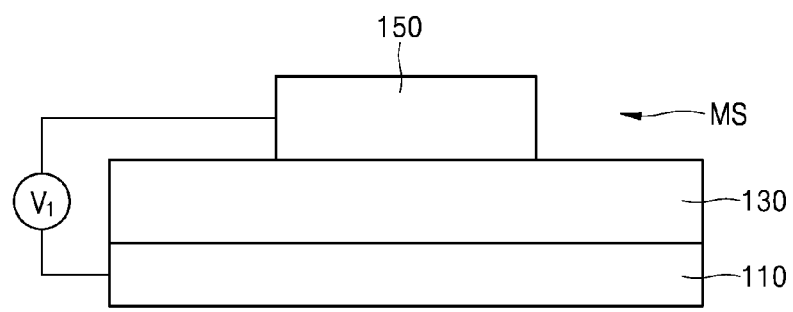
FIGS. 3A3B, and 3C illustrate an example in which a variable resistance material layer of the light modulating device of FIG. 1 includes a material that forms conductive nano-filaments according to a voltage applied thereto.
Figure 3B:
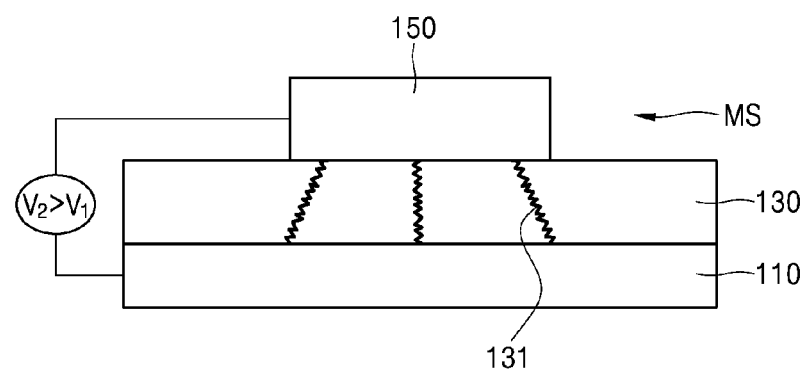
Figure 3C:
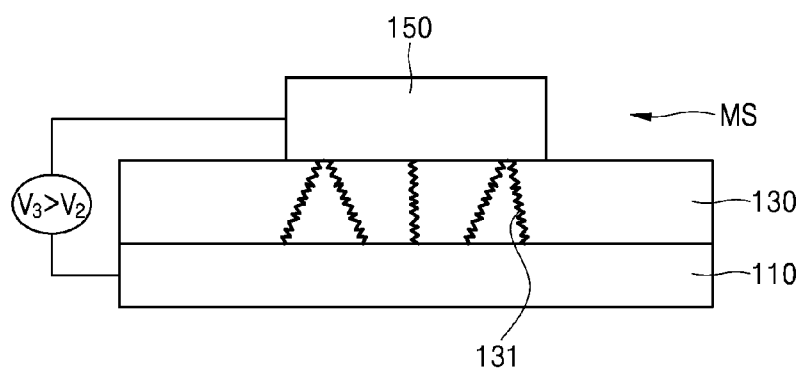

FIGS. 3A to 3C illustrate an example in which the variable resistance material layer 130 of the light modulating device 100 of FIG. 1 includes a material that forms conductive nano-filaments according to a voltage applied thereto.

Referring to FIG. 3A, when a voltage $V_1$ is applied between the conductive nano-antenna 150 and the metal layer 110, no conductive nano-filaments are formed in the variable resistance material layer 130, and thus, the variable resistance material layer 130 may be in a high resistance state in which it functions as an insulator. The voltage $V_1$ may be 0 V, or may be lower than a threshold voltage for forming the conductive nano-filaments.

Referring to FIG. 3B, when a voltage $V_2$ higher than $V_1$ is applied between the conductive nano-antenna 150 and the metal layer 110, conductive nano-filaments 131 may be formed in the variable resistance material layer 130. The conductive nano-filaments 131 form conduction paths between the conductive nano-antenna 150 and the metal layer 110, and thus, the variable resistance material layer 130 enters a low resistance state, as compared with the case in which no conductive nano-filaments 131 are formed. In the low resistance state, the refractive index of the variable resistance material layer 130 is different from the refractive index in the case in which no conductive nano-filaments 131 are formed.

Referring to FIG. 3C, when a voltage $V_3$ higher than $V_2$ is applied between the conductive nano-antenna 150 and the metal layer 110, conductive nano-filaments 131 may be formed in the variable resistance material layer 130, and the number of conductive nano-filaments 131 may be greater than that of the case in which the applied voltage is $V_2$. Since the conductive nano-filaments 131 form conduction paths between the conductive nano-antenna 150 and the metal layer 110, and the number of conduction paths is greater than that of the case in which the voltage is $V_2$, the variable resistance material layer 130 enters a low resistance state, as compared with the case in which the applied voltage is $V_2$. That is, the variable resistance material layer 130 exhibits a resistance that is different from that that exhibited in the case in which the applied voltage is $V_2$, and has a different refractive index.

An example in which the number of conductive nano-filaments 131 formed in the variable resistance material layer 130 changes according to the applied voltage is illustrated in FIGS. 3A to 3C, but exemplary embodiments are not limited thereto. For example, a size (for example, thickness) of the conductive nano-filament 131 may change according to the applied voltage.

Figure 4A:
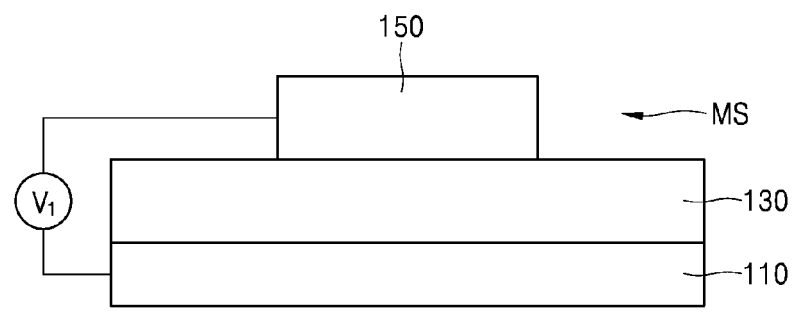
FIGS. 4A, 4B, and 4C illustrate an example in which the variable resistance material layer of the light modulating device of FIG. 1 includes a material that increases an area of a low resistance region according to a voltage applied thereto.
Figure 4B:
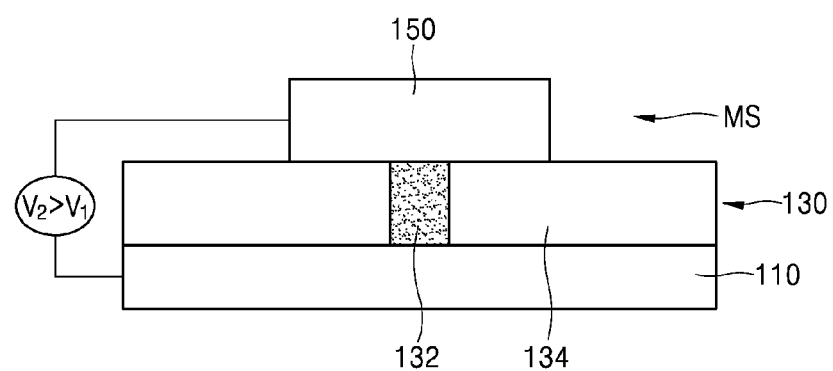
Figure 4C:
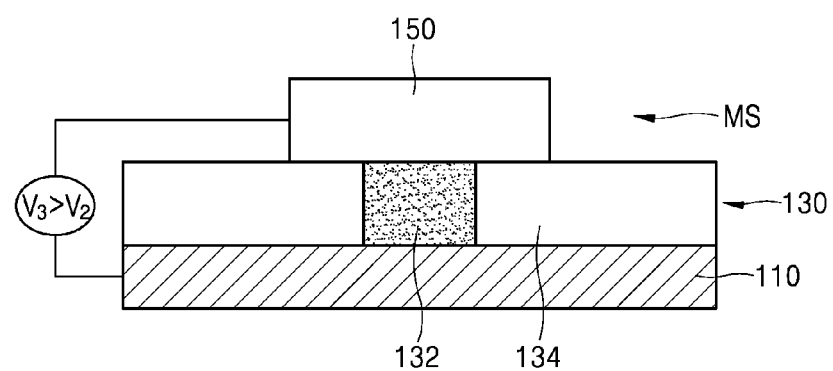

FIGS. 4A to 4C illustrate an example in which the variable resistance material layer 130 of the light modulating device 100 of FIG. 1 includes a material that increases an area of a low resistance region according to a voltage applied thereto.

The variable resistance material layer 130 may include a metal oxide, for example, an oxide of a metal having a plurality of oxidation states. The variable resistance material layer 130 may include $MO_x$, and M may be Ni, Ta, Ni, Hf, Fe, W, Mn, or Co and x is real number.

When the variable resistance material layer 130 includes $MO_x$, a low resistance region including M and a high resistance region including $MO_x$ may be formed in the variable resistance material layer 130 by a voltage applied to the variable resistance material layer 130. The area of the low resistance region may be adjusted according to the applied voltage.

Referring to FIG. 4A, when the variable resistance material layer 130 includes $MO_x$ and a voltage $V_1$ is applied between the conductive nano-antenna 150 and the metal layer 110, no low resistance region is formed in the variable resistance material layer 130, and thus, the variable resistance material layer 130 may be in a high resistance state in which it functions as an insulator. The voltage $V_1$ may be 0 V, or may be lower than a threshold voltage for forming a high resistance region.

Referring to FIG. 4B, when a voltage $V_2$ higher than $V_1$ is applied between the conductive nano-antenna 150 and the metal layer 110, a low resistance region 132 may be formed in the variable resistance material layer 130. The low resistance region 132 may include, for example, a metal material M. The high resistance region 134 may include $MO_x$. However, exemplary embodiments of the present disclosure are not limited thereto. The low resistance region 132 may include $MO_x$ exhibiting a relatively low resistance because x is different from that in the high resistance region 134.

The low resistance region 132 forms a conduction path between the conductive nano-antenna 150 and the metal layer 110, and thus, the variable resistance material layer 130 enters a low resistance state, as compared with the case in which no low resistance region 132 is formed. In the low resistance state, a refractive index of the variable resistance material layer 130 is different from a refractive index of the variable resistance material layer 130 in the case in which no low resistance region 132 is formed.

Referring to FIG. 4C, when a voltage $V_3$ higher than $V_2$ is applied between the conductive nano-antenna 150 and the metal layer 110, a low resistance region 132 may be formed in the variable resistance material layer 130, and a size of the low resistance region 132 may be greater than that in the case in which the voltage is $V_2$. Since the low resistance region 132 forms the conduction path between the conductive nano-antenna 150 and the metal layer 110 and a width of the conduction path is wider than that in the case in which the voltage is $V_2$, the variable resistance material layer 130 is in a low resistance state, as compared with the case in which the applied voltage is $V_2$. That is, the variable resistance material layer 130 shows a resistance state that is different from that that in the case in which the applied voltage is $V_2$, and has a different refractive index.

As described above, the variable resistance material layer 130 capable of exhibiting a plurality of resistance states is a material that exhibits multi-states and is known to well maintain a set state even after time passes. Also, the set state is easily reversed according to the application of another signal. That is, the variable resistance material layer 130 maintains a set resistance state until another voltage is applied, and has a fast switching time according to a voltage applied thereto. That is, the resistance state of the variable resistance material layer 130 is quickly changed according to the applied voltage. For example, the nano-filamentary material may have a switching time of nano-seconds. Therefore, the phase of the incident light may be easily modulated by employing the variable resistance material layer 130 in the light modulating device 100.

Figure 5:
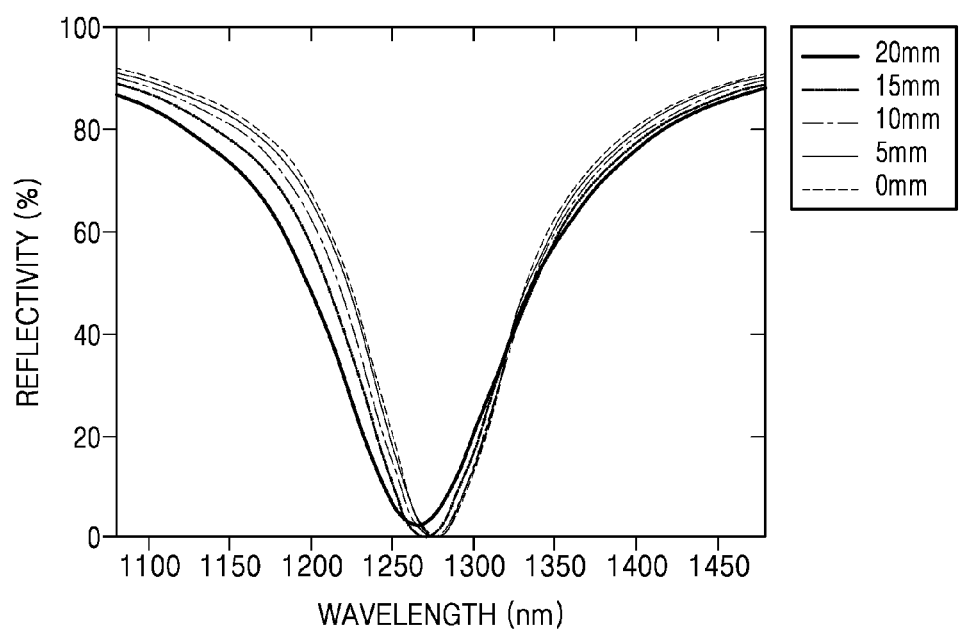
FIGS. 5, 6, and 7 are computer simulation graphs showing that phase modulation characteristics of the variable resistance material layer included in the light modulating device of FIG. 1 are adjusted according to a voltage applied thereto.
Figure 6:
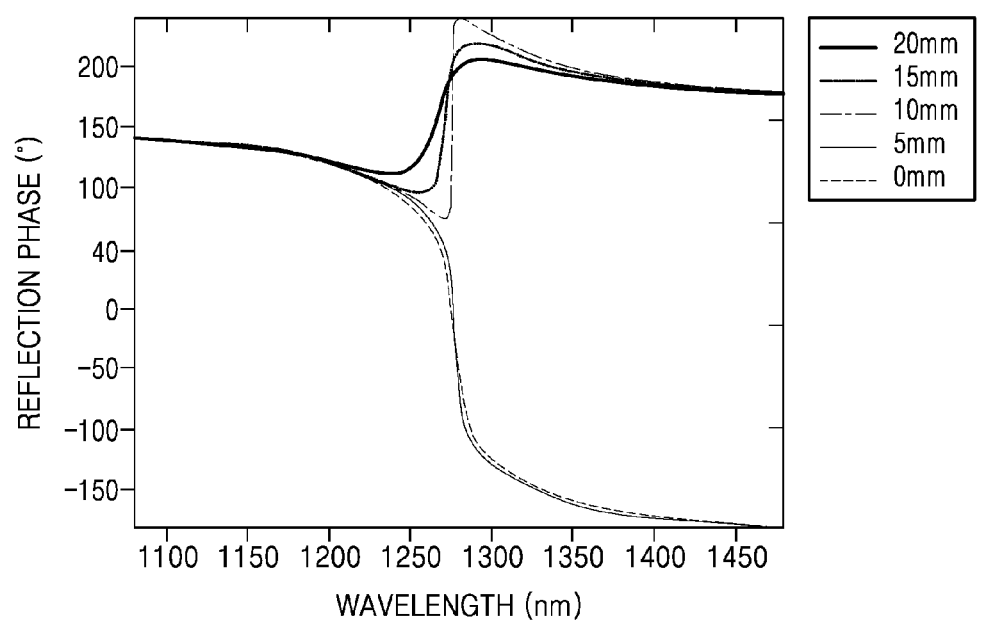
Figure 7:
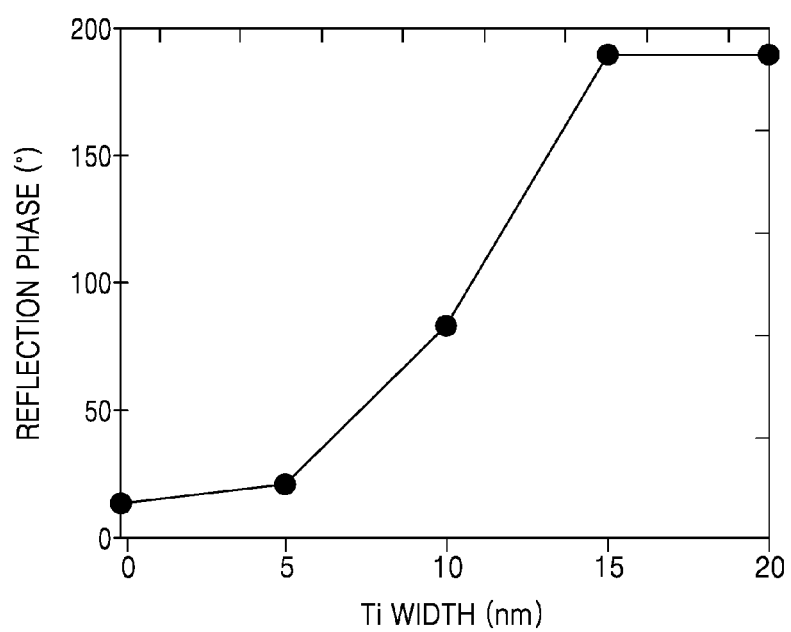

FIGS. 5 to 7 are computer simulation graphs showing that phase modulation characteristics of the variable resistance material layer 130 included in the light modulating device 100 of FIG. 1 are adjusted according to a voltage applied thereto;

In the computer simulations, it was assumed that the variable resistance material layer 130 had the behaviors illustrated in FIGS. 4A to 4C according to the applied voltage, and the low resistance region 132 and the high resistance region 134 were respectively set to Ti and $TiO_2$. The conductive nano-antenna 150 and the metal layer 110 were each set to Au.

FIG. 5 shows a reflectivity with respect to a wavelength of incident light when the width of the low resistance region 132 is 0 nm, 5 nm, 10 nm, 15 nm, and 20 nm.

A wavelength band, in which the reflectivity is minimum, is a resonance wavelength band. That is, the light modulating device 100 may modulate light in such a wavelength band. The resonance wavelength band mainly depends on the shape of the conductive nano-antenna 150. Therefore, when the width of the low resistance region 132 formed in the variable resistance material layer 130 by the applied voltage is in a range of 0 nm to 20 nm, the resonance wavelength band is generally constant.

FIG. 6 shows a reflection phase with respect to a wavelength of incident light when the width of the low resistance region 132 is 0 nm, 5 nm, 10 nm, 15 nm, and 20 nm. FIG. 7 is a graph showing a phase change range according to the width of the low resistance region 132.

Referring to the graph of FIG. 6, the reflection phase is rapidly changed as the width of the low resistance region 132 is changed among 0 nm, 5 nm, 10 nm, 15 nm, and 20 nm, with respect to light of the resonance wavelength band of FIG. 5, for example, a wavelength of about 1,270 nm. It can be seen that the phase of light in a predetermined wavelength band may be modulated differently according to the applied voltage.

FIG. 7 shows a phase change range with respect to light in a resonance wavelength band, for example, a wavelength of about 1,270 nm. It can be seen that a phase change width of about 200° is implemented.

The light modulating device 100 described above may implement a wide phase change width. In implementing such a phase change width, the performance control of the light modulating device 100 is facilitated in that an entire region of the variable resistance material layer 130 becomes an effective region in which the refractive index changes according to the applied voltage.

Figure 8:
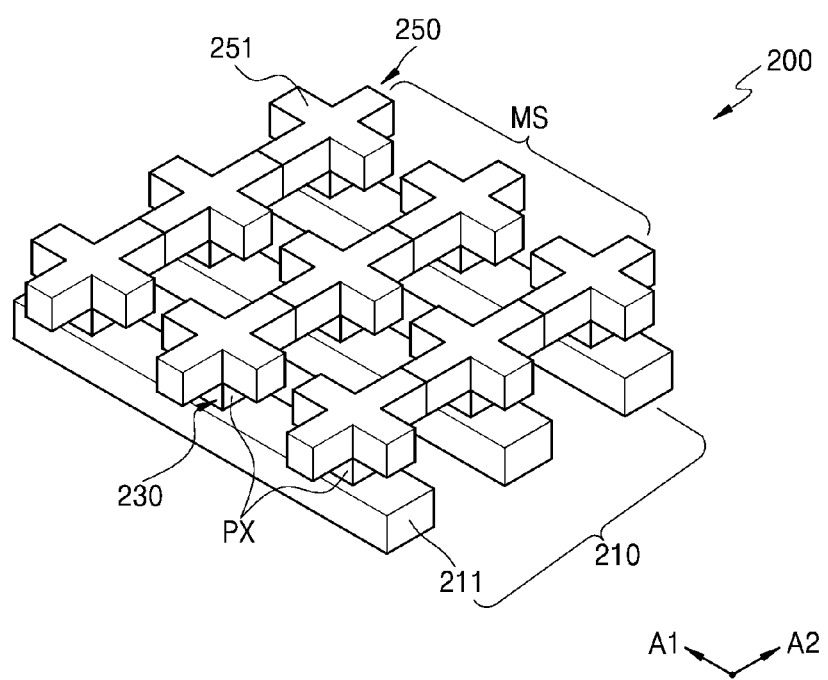
FIG. 8 is a perspective view illustrating a schematic configuration of a light modulating device according to another exemplary embodiment.
Figure 9:
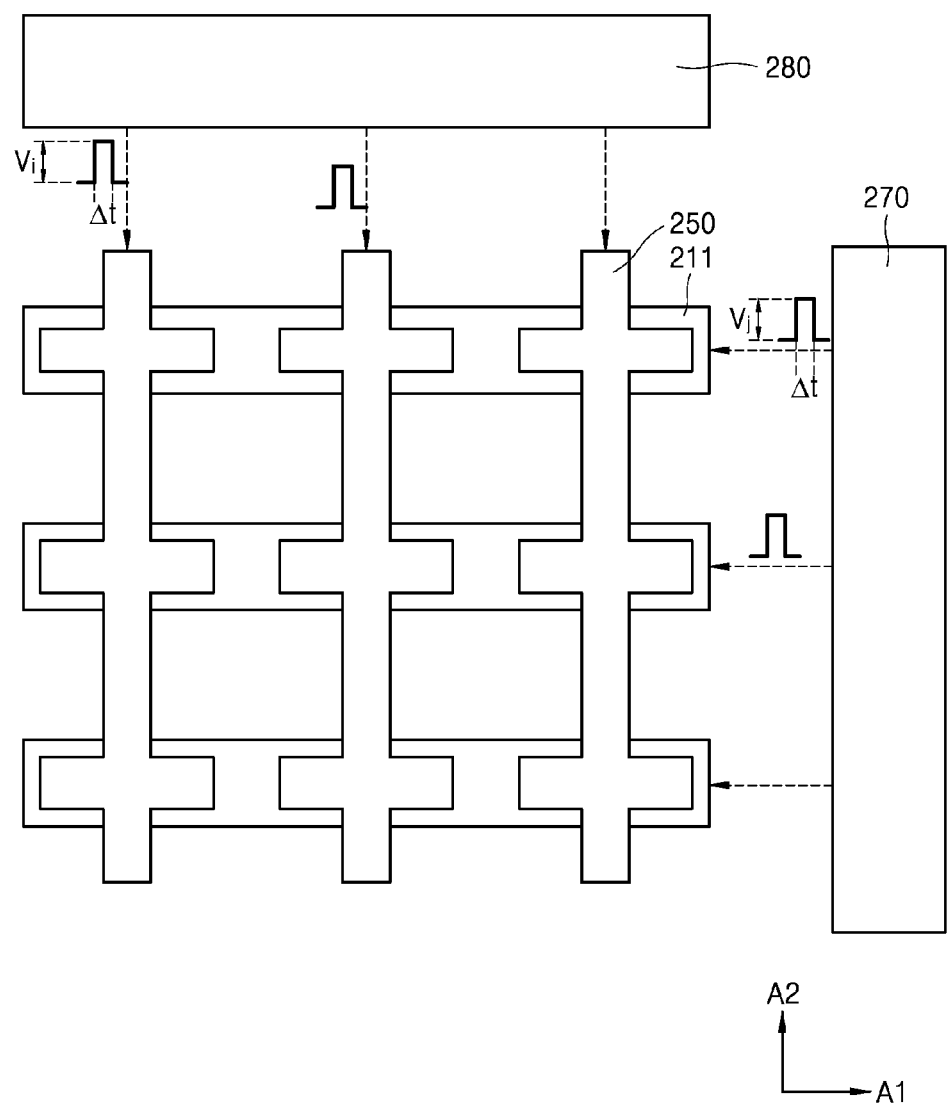
FIG. 9 is a plan view illustrating a schematic circuit configuration that applies an electrical signal to the light modulating device of FIG. 8.

FIG. 8 is a perspective view illustrating a schematic configuration of a light modulating device 200 according to another exemplary embodiment. FIG. 9 is a plan view illustrating a schematic circuit configuration that applies an electrical signal to the light modulating device 200 of FIG. 8.

The light modulating device 200 includes a metal layer 210, a variable resistance material layer 230 above the metal layer 210, and a meta surface layer MS above the variable resistance material layer 230. The meta surface layer MS includes a plurality of conductive nano-antennas 251.

The metal layer 210 includes a plurality of metal lines 211. A longitudinal direction of the metal lines 211 is a first direction A1, and the metal lines 211 are repeatedly arranged in a second direction A2 intersecting with the first direction A1. In other words, the metal lines 211 extend, lengthwise, in the first direction A1. The first direction A1 may be perpendicular to the second direction A2, but exemplary embodiments of the present disclosure are not limited thereto.

The conductive nano-antennas 251 may be two-dimensionally arranged in the first direction A1 and the second direction A2. Among the conductive nano-antennas 251, the conductive nano-antennas which are adjacent to each other in the second direction A2 are connected to each other to form conductive nano-antenna lines 250 which extend in the second direction A2. That is, the conductive nano-antenna lines 250 are repeatedly arranged and spaced apart from each other in the first direction A1. According to such arrangement, the same electrical signal may be applied to all of the conductive nano-antennas 251 included in the same conductive nano-antenna line 250.

The conductive nano-antennas 251 are illustrated as having the shape shown in FIG. 2B, that is, a cross-shaped cross-section, but exemplary embodiments of the present disclosure are not limited thereto. The conductive nano-antennas 251 may have the shape shown in either FIG. 2A or 2C or any other modified shape.

The variable resistance material layer 230 partitions a plurality of pixels PX two-dimensionally arranged and spaced apart from each other in the first direction A1 and the second direction A2. The pixels PX are arranged at positions at which the metal lines 211 and the conductive nano-antenna lines 250 intersect with each other. Resistance states of the pixels PX are adjusted according to electrical signals applied to the metal lines 211 and the conductive nano-antenna lines 250. The pixels PX may exhibit different refractive indices, and the degree to which the conductive nano-antennas 251 of the positions corresponding thereto modulate the incident light may be adjusted.

As illustrated in FIG. 9, electrical signals applied to the metal lines 211 may be controlled by a first signal controller 270. Also, electrical signals applied to the conductive nano-antenna lines 250 may be controlled by a second signal controller 280.

The first signal controller 270 may sequentially apply a voltage signal of a pulse form having a width of $\Delta t$ and an amplitude of $V_j$ to the conductive nano-antenna lines 250.

The second signal controller 280 may sequentially apply a voltage signal of a pulse form having a width of $\Delta t$ and an amplitude of $V_i$ to the conductive nano-antenna lines 250.

The values of Vi and Vj may be determined according to a resistance state to be implemented in each of the pixels PX, and may be determined according to the degree of a refractive index change in each of the pixels PX by taking into account the phase modulation profile to be implemented in the light modulating device 200.

Since the variable resistance material layer 230 has a property of maintaining the multi-states, the resistance state of the pixel PX formed by the applied electrical signal is maintained until a next electrical signal is applied after the electrical signal of the pulse form is applied. Therefore, a separate switch element for maintaining the resistance state of each of the pixels PX, for example, a transistor or a diode, may be omitted between the conductive nano-antennas 251 and the variable resistance material layer 230, or between the variable resistance material layer 230 and the metal line 211. That is, the variable resistance material layer 230 and the metal line 211 may directly contact each other, and the conductive nano-antenna 251 and the variable resistance material layer 230 may directly contact each other.

Figure 10:
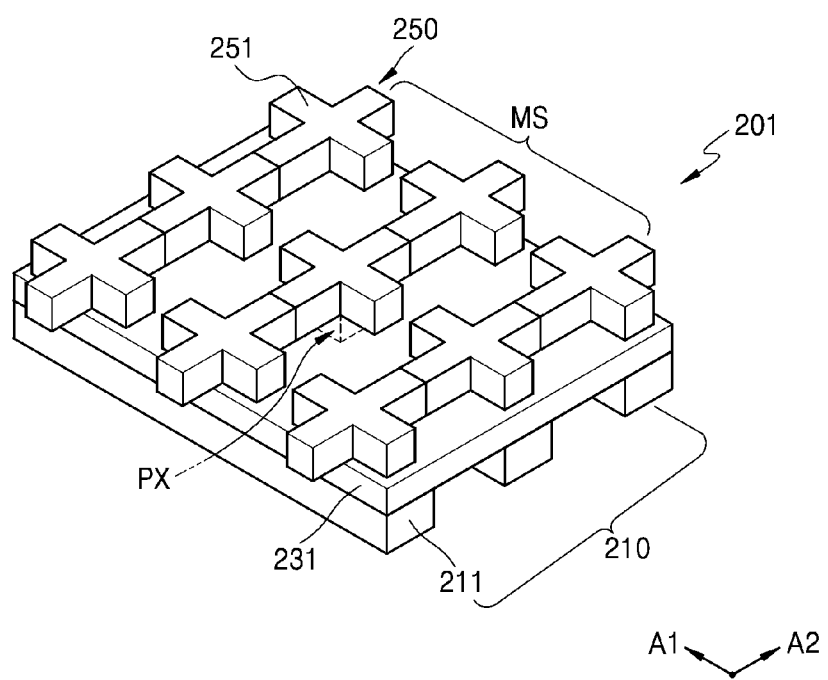
FIG. 10 is a perspective view illustrating a schematic configuration of a light modulating device according to another exemplary embodiment.

FIG. 10 is a perspective view illustrating a schematic configuration of a light modulating device 201 according to another exemplary embodiment.

The light modulating device 201 includes a metal layer 210, a variable resistance material layer 231 above the metal layer 210, and a meta surface layer MS above the variable resistance material layer 231. The meta surface layer MS includes a plurality of conductive nano-antennas 251.

The metal layer 210 includes a plurality of metal lines 211. A longitudinal direction of the metal lines 211 is a first direction A1, and the metal lines 211 are repeatedly arranged in a second direction A2 intersecting with the first direction A1. In other words, the metal lines extend, lengthwise, in the first direction A1. The first direction A1 may be perpendicular to the second direction A2, but exemplary embodiments of the present disclosure are not limited thereto.

The conductive nano-antennas 251 may be two-dimensionally arranged in the first direction A1 and the second direction A2. Among the conductive nano-antennas 251, the conductive nano-antennas which are adjacent to each other in the second direction A2 are connected to each other to form conductive nano-antenna lines 250 which extend in the second direction A2. That is, the conductive nano-antenna lines 250 are repeatedly arranged and spaced apart from each other in the first direction A1. According to such arrangement, the same electrical signal may be applied to all of the conductive nano-antennas 251 included in the same conductive nano-antenna line 250.

The variable resistance material layer 231 of the present exemplary embodiment differs from the variable resistance material layer 230 of the light modulating device 200 of FIG. 8 in that the regions forming the pixels PX are not artificially partitioned.

The variable resistance material layer 231 may include a layer that covers all the metal lines 211, and it can be considered that the pixels PX are formed in the regions of the variable resistance material layer 231 corresponding to the positions at which the conductive nano-antenna lines 250 and the metal lines 211 intersect with each other.

As in FIG. 9, electrical signals may be applied to the conductive nano-antenna lines 250 and the metal lines 211 of the light modulating device 201 of FIG. 10. Even if the region of the variable resistance material layer 231 is not partitioned as illustrated in FIG. 8, a resistance state of a predetermined region may be independently controlled according to electrical signals applied to the conductive nano-antenna lines 250 and the metal lines 211 intersecting with each other, and a desired phase profile may be implemented.

Figure 11:
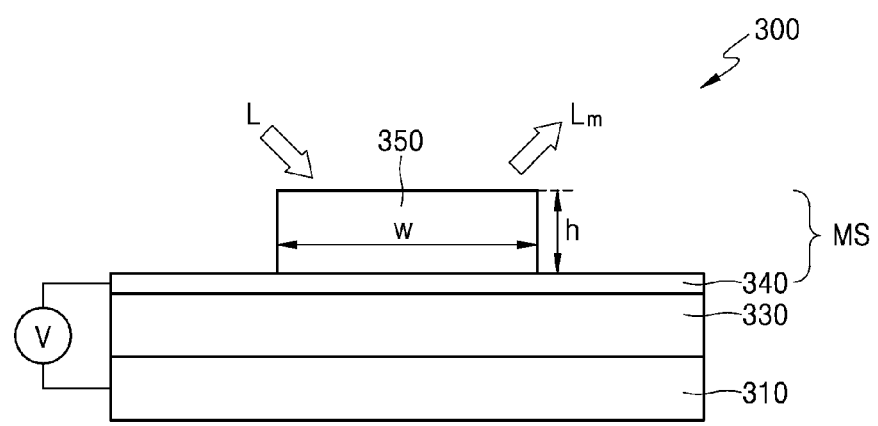
FIG. 11 is a cross-sectional view illustrating a schematic configuration of a light modulating device according to another exemplary embodiment.

FIG. 11 is a cross-sectional view illustrating a schematic configuration of a light modulating device 300 according to another exemplary embodiment.

The light modulating device 300 modulates incident light $L_i$ and outputs modulated light $L_m$. The light modulating device 300 includes a metal layer 310, a variable resistance material layer 330 above the metal layer 310, and a meta surface layer MS above the variable resistance material layer 330.

The meta surface layer MS includes a conductive material layer 340, and a plurality of dielectric nano-antennas 350 each having a sub-wavelength dimension. For convenience, one dielectric nano-antenna 350 is illustrated in the drawing. A sub-wavelength dimension is a dimension that is less than a wavelength of the incident light $L_i$ to be modulated by the light modulating device 300. With respect to the dielectric nano-antenna 350, for example, at least one of a width w and a thickness h, may be less than the wavelength of the incident light $L_i$.

The dielectric nano-antenna 350 may include a dielectric material and modulate a phase of light within a predetermined wavelength band. Such a function is caused by Mie resonance due to a displacement current formed in the dielectric material. The degree of phase modulation and resonance wavelength may be controlled by controlling the detailed shape of the dielectric nano-antenna 350 and the refractive index of the variable resistance material layer 330. The dielectric nano-antenna 350 may have a refractive index that is greater than that of the variable resistance material layer 330.

The dielectric nano-antenna 350 may have any of various shapes so long as the shape includes a sub-wavelength dimension. The dielectric nano-antenna 350 may take the shape of a cylinder, an elliptic cylinder, or a polyprism shape, and may have an asymmetric shape. The dielectric nano-antenna 350 may have any of the shapes of the conductive nano-antennas 150 illustrated in FIGS. 2A to 2C.

The conductive material layer 340 is provided to control the resistance state of the variable resistance material layer 330 by applying a voltage between the conductive material layer 340 and the metal layer 310. The conductive material layer 340 may include a transparent conductive material, for example, indium tin oxide (ITO), indium zinc oxide (IZO), aluminum zinc oxide (AZO), or gallium zinc oxide (GZO).

The conductive material layer 340 may directly contact the variable resistance material layer 330.

The light modulating device 300 of the present exemplary embodiment is substantially identical to the light modulating device 100 of FIG. 1, except that the meta surface layer MS includes the conductive material layer 340 and the dielectric nano-antenna 350.

That is, the variable resistance material layer 330 is a material having a plurality of resistance states depending on a voltage applied thereto. As illustrated in FIGS. 3A to 3C, the variable resistance material layer 330 may include a material that forms nano-filaments according to a voltage applied thereto. Alternatively, as illustrated in FIGS. 4A to 4C, the variable resistance material layer 330 may include $MO_x$ (where M is Ni, Ta, Ni, Hf, Fe, W, Mn, or Co and x is real number), and may include a material in which a low resistance region including M and a high resistance region including $MO_x$ are formed in the variable resistance material layer 330 according to a voltage applied thereto.

The metal layer 310 may apply a voltage between the metal layer 310 and the conductive material layer 340, and may function as a mirror layer that reflects light. The metal layer 310 may include any of various metal materials capable of executing such a function.

Figure 12:
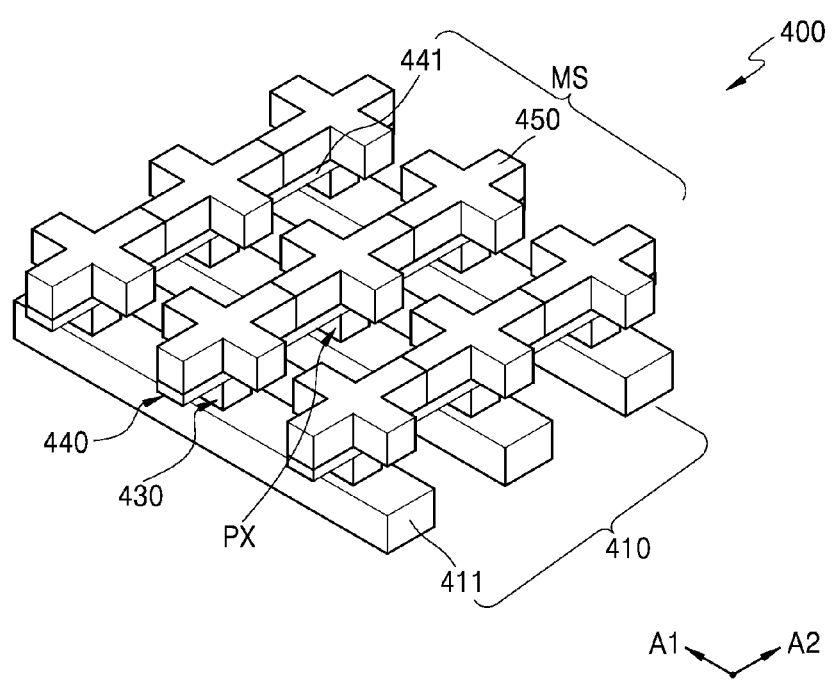
FIG. 12 is a perspective view illustrating a schematic configuration of a light modulating device according to another exemplary embodiment.
Figure 13:
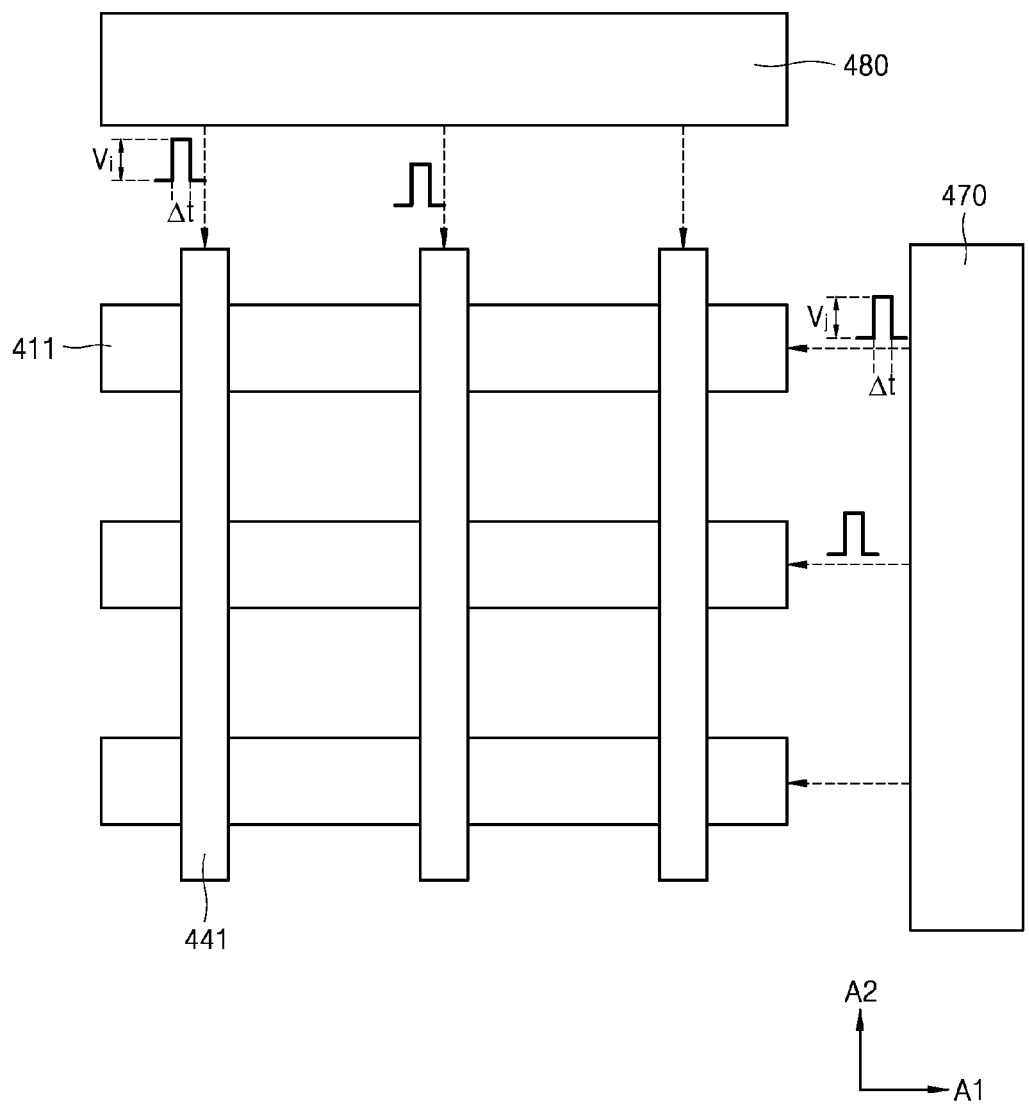
FIG. 13 is a plan view illustrating a schematic circuit configuration that applies an electrical signal to the light modulating device of FIG. 12.

FIG. 12 is a perspective view illustrating a schematic configuration of a light modulating device 400 according to another exemplary embodiment, and FIG. 13 is a plan view illustrating a schematic circuit configuration that applies an electrical signal to the light modulating device 400 of FIG. 12.

The light modulating device 400 includes a metal layer 410, a variable resistance material layer 430 above the metal layer 410, and a meta surface layer MS above the variable resistance material layer 430. The meta surface layer MS includes a conductive material layer 340 and a plurality of dielectric nano-antennas 450.

The metal layer 410 includes a plurality of metal lines 411. A longitudinal direction of the metal lines 411 is a first direction A1, and the metal lines 411 are repeatedly arranged in a second direction A2 intersecting with the first direction A1. In other words, the metal lines extend, lengthwise, in the first direction A1. The first direction A1 may be perpendicular to the second direction A2, but exemplary embodiments of the present disclosure are not limited thereto.

The conductive material layer 440 includes a plurality of conductive lines 441. A longitudinal direction of the plurality of conductive lines 441 is a second direction A2 and the plurality of conductive lines 441 are repeatedly arranged and spaced apart from each other in a first direction A1.

The dielectric nano-antennas 450 may be two-dimensionally arranged in the first direction A1 and the second direction A2. The dielectric nano-antennas 450 which are adjacent to each other in the second direction A2 are connected to each other, but exemplary embodiments of the present disclosure are not limited thereto. The dielectric nano-antennas 450 may be arranged and spaced apart from each other in the first direction A1 and the second direction A2.

The variable resistance material layer 430 partitions a plurality of pixels PX two-dimensionally arranged and spaced apart from each other in the first direction A1 and the second direction A2. The pixels PX are arranged at positions at which the metal lines 411 and the conductive lines 441 intersect with each other. Resistance states of the pixels PX are adjusted according to electrical signals applied to the metal lines 411 and the conductive lines 441. The pixels PX may exhibit different refractive indices, and the degree to which the dielectric nano-antennas 450 of the positions corresponding thereto modulate the incident light may be adjusted.

As illustrated in FIG. 13, electrical signals applied to the metal lines 411 may be controlled by a first signal controller 470. Also, electrical signals applied to the conductive lines 441 may be controlled by a second signal controller 480.

The first signal controller 470 may sequentially apply a voltage signal of a pulse form having a width of Δt and an amplitude of $V_j$ to the metal lines 411.

The second signal controller 480 may sequentially apply a voltage signal of a pulse form having a width of Δt and an amplitude of $V_j$ to the conductive lines 441.

The values of Vi and Vj may be determined according to a resistance state to be implemented in each of the pixels PX, and may be determined according to the degree of a refractive index change in each of the pixels PX by taking into account the phase modulation profile to be implemented in the light modulating device 400.

Since the variable resistance material layer 430 can maintain the multi-states, the resistance state of the pixel PX formed by the applied electrical signal is maintained until a next electrical signal is applied after the electrical signal of the pulse form is applied. Therefore, a separate switch element for maintaining the resistance state of each of the pixels PX, for example, a transistor or a diode, may be omitted between the conductive lines 441 and the variable resistance material layer 430, or between the variable resistance material layer 430 and the metal line 411. That is, the variable resistance material layer 430 and the metal line 411 may directly contact each other, and the conductive material layer 440 and the variable resistance material layer 430 may directly contact each other.

Figure 14:
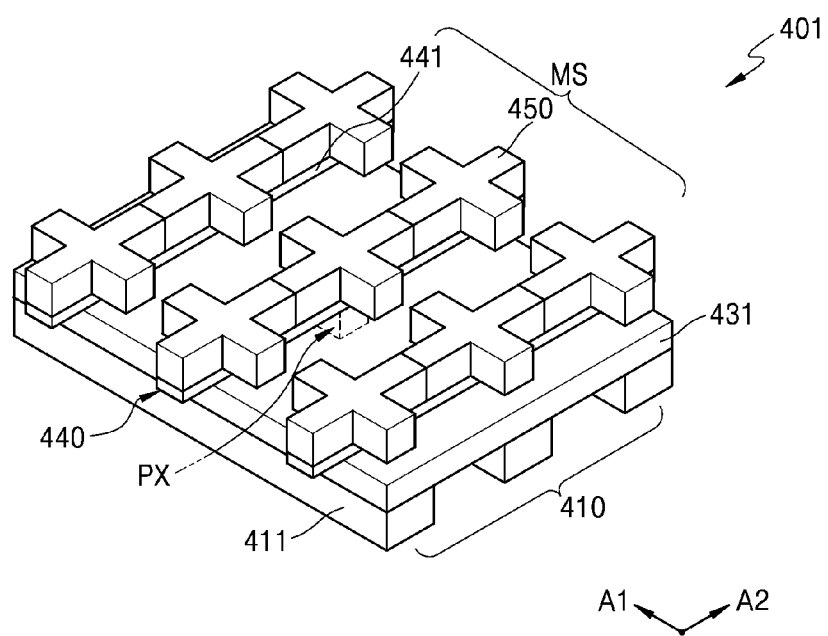
FIG. 14 is a perspective view illustrating a schematic configuration of a light modulating device according to another exemplary embodiment.

FIG. 14 is a perspective view illustrating a schematic configuration of a light modulating device 401 according to another exemplary embodiment.

The light modulating device 401 includes a metal layer 410, a variable resistance material layer 431 above the metal layer 410, and a meta surface layer MS above the variable resistance material layer 431. The meta surface layer MS includes a conductive material layer 440 and a plurality of dielectric nano-antennas 450.

The metal layer 410 includes a plurality of metal lines 411. A longitudinal direction of the metal lines 411 is a first direction A1, and the metal lines 411 are repeatedly arranged in a second direction A2 intersecting with the first direction A1. In other words, the metal lines extend, lengthwise, in the first direction A1. The first direction A1 may be perpendicular to the second direction A2, but exemplary embodiments of the present disclosure are not limited thereto.

The dielectric nano-antennas 450 may be two-dimensionally arranged in the first direction A1 and the second direction A2. The dielectric nano-antennas 450 which are adjacent to each other in the second direction A2 are connected to each other, but exemplary embodiments are not limited thereto. The dielectric nano-antennas 450 may be repeatedly arranged and spaced apart from each other in the first direction A1 and the second direction A2.

The variable resistance material layer 431 of the present exemplary embodiment differs from the variable resistance material layer 430 of the light modulating device 400 of FIG. 12 in that the regions for a plurality of pixels PX are not artificially partitioned.

The variable resistance material layer 431 may include a layer that covers all the metal lines 411, and it can be considered that the pixels PX are formed in the regions of the variable resistance material layer 431 corresponding to the positions at which the conductive lines 441 and the metal lines 411 intersect with each other.

As in FIG. 13, electrical signals may be applied to the conductive lines 441 and the metal lines 411 of the light modulating device 401 of FIG. 14. Even if the region of the variable resistance material layer 431 is not partitioned as illustrated in FIG. 12, a resistance state of a predetermined region may be independently controlled according to electrical signals applied to the conductive lines 441 and the metal lines 411 intersecting with each other, and a desired phase profile may be implemented.

Since the light modulating devices 100, 200, 201, 300, 400, and 401 described herein may implement a desired phase profile and exhibit various optical performances, the light modulating devices 100, 200, 201, 300, 400, and 401 may be applied for use in any of various optical devices.

The light modulating devices 100, 200, 201, 300, 400, and 401 may be applied as, for example, a beam splitter for splitting incident light in various directions, a beam shaping device for shaping a beam shape, and a beam steering device for steering light in a desired direction. In addition, the light modulating devices 100, 200, 201, 300, 400, and 401 may be applied as an optical lens having refractive power, a variable device that provides a variable focus, and the like.

Also, since the variable resistance material layers included in the light modulating devices 100, 200, 201, 300, 400, and 401 maintain a resistance state formed by a predetermined electrical signal until a next electrical signal is applied, the light modulating devices 100, 200, 201, 300, 400, and 401 may be used as a device for beam steering in various directions, for example, beam steering in a two-dimensional direction, without an additional element such as a transistor.

Figure 15:
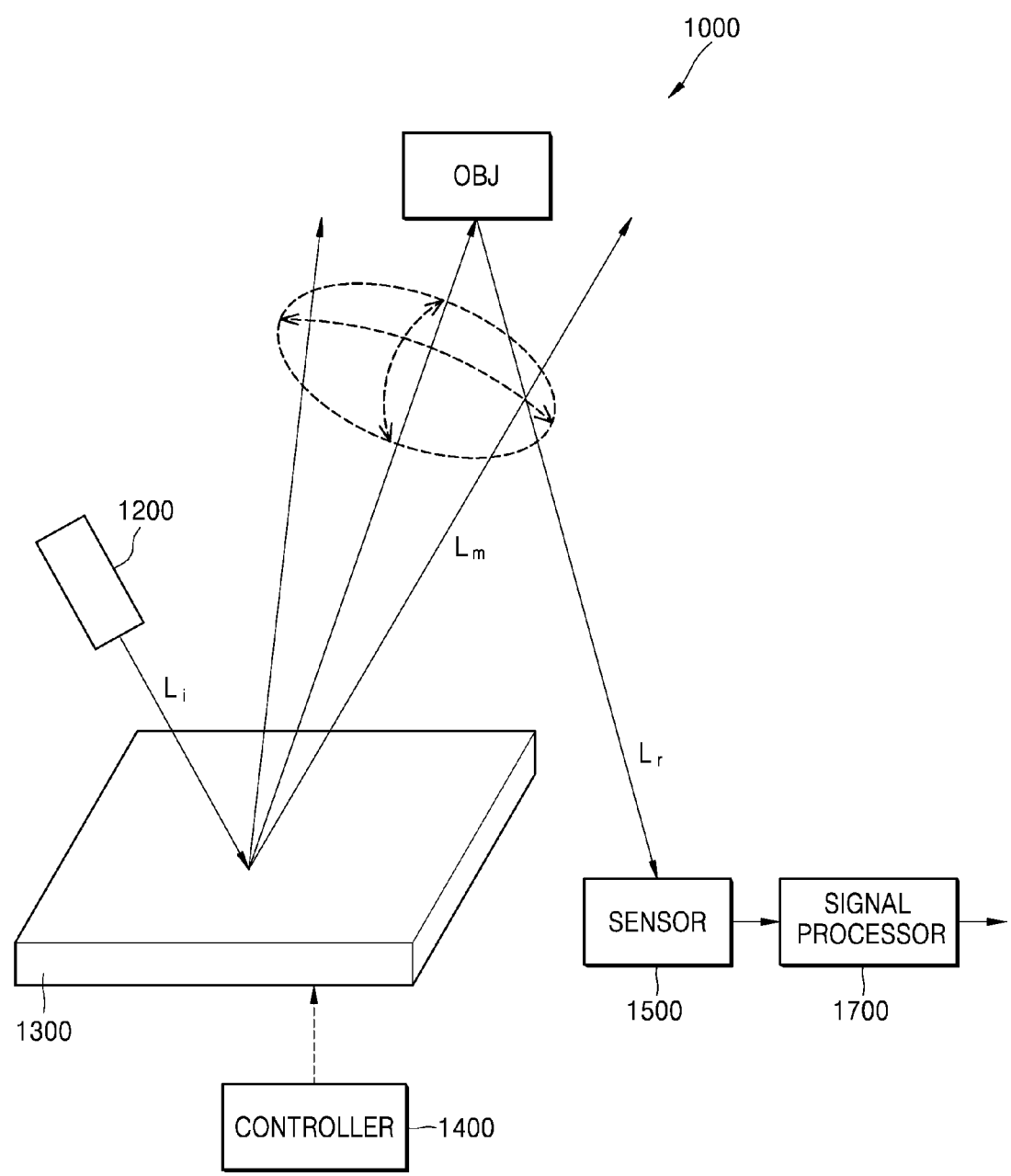
FIG. 15 is a block diagram illustrating a schematic configuration of a lidar apparatus according to an exemplary embodiment.

FIG. 15 is a block diagram illustrating a configuration of a Light Detection and Ranging (lidar) apparatus 1000 according to an exemplary embodiment.

The lidar apparatus 1000 includes a light source 1200 configured to irradiate light, a light modulating device 1300 configured to aim the light irradiated from the light source 1200 toward an object OBJ, and a sensor 1500 configured to sense light reflected from the object OBJ.

The lidar apparatus 1000 may further include a controller 1400 configured to adjust a phase profile in the light modulating device 1300, and a signal processor 1700 configured to process a signal sensed by the sensor 1500.

The light source 1200 irradiates light to be used for analyzing a position and a shape of the object OBJ. The light source 1200 may include a light source configured to generate and irradiate light within a predetermined wavelength. The light source 1200 may include a light source, such as a laser diode (LD), a light emitting diode (LED), or a super luminescent diode (SLD), which is configured to generate and irradiate light in a wavelength band suitable for position and shape analysis of the object OBJ, for example, light in an infrared wavelength band. The light source 1200 may be configured to generate and irradiate light in a plurality of different wavelength bands. The light source 1200 may be configured to generate and irradiate pulsed light or continuous light.

The light modulating device 1300 modulates incident light $L_i$ and outputs modulated light $L_m$. The light modulating device 1300 may have a structure of any one of the light modulating devices 100, 200, 201, 300, 400, and 401 or a structure modified therefrom. Since the light modulating device 1300 utilizes the variable resistance material layer having a plurality of resistance states, a desired phase profile may be implemented at a high speed. Also, since the variable resistance material layer included in the light modulating device 1300 maintains a resistance state formed by a predetermined electrical signal until before a next electrical signal is applied, the light modulating device 1300 may be used as a device for beam steering in various directions, for example, beam steering in a two-dimensional direction, without an additional element such as a transistor.

Other optical members, for example, members for path adjustment of light irradiated from the light source 1200, wavelength division, or additional modulation, may be further disposed between the light source 1200 and the light modulating device 1300 and/or between the light modulating device 1300 and the object OBJ.

The sensor 1500 may include an array of a plurality of light detection elements configured to sense light reflected from the object OBJ. The sensor 1500 may include arrays of light detection elements configured to sense light of a plurality of different wavelengths.

The controller 1400 may control a signal input to the light modulating device 1300 so that the light modulating device 1300 has a phase profile to execute a beam steering function. As described with reference to FIGS. 9 and 13, the light modulating device 1300 may include first and second signal controllers, and the controller 1400 may control the first and second signal controllers of the light modulating device 1300 to adjust a steering direction of the light modulating device 1300 in time series and scan the object OBJ.

In addition, the controller 1400 may control the overall operation of the lidar apparatus 1000 including the operation of the light source 1200 and the sensor 1500. For example, the controller 1400 may perform power supply control, on/off control, and generation control of pulse wave (PW) or continuous wave (CW) with respect to the light source 1200. Also, the controller 1400 may apply a control signal to each of the light detection elements included in the sensor 1500, and apply a control signal necessary for calculations in the signal processor 1700.

The light modulating device 1300 may perform beam steering in a two-dimensional direction, and thus, may scan the object OBJ in a two-dimensional direction. While the object OBJ is being scanned, reflected light $L_r$ reflected from the object OBJ is sensed by the sensor 1500. The sensed light signal may be transferred to the signal processor 1700 and used to analyze the presence or absence of the object OBJ, the position of the object OBJ, or the shape of the object OBJ.

The signal processor 1700 may perform a predetermined calculation, for example, a calculation for measuring light time of flight, from the light signal sensed by the sensor 1500, and may perform three-dimensional shape determination of the object OBJ therefrom. The signal processor 1700 may use any of various calculation methods. For example, a direct time measurement method projects pulsed light on the object OBJ and calculates a distance by measuring the time taken until light reflected from the object OBJ is returned back by using a timer. A correlation method projects pulsed light on the object OBJ and measures a distance from brightness of reflected light that is reflected from the object OBJ and returned back. A phase delay measurement method projects a continuous wave such as a sine wave on the object OBJ, detects a phase difference of reflected light that is reflected from the object OBJ and returned back, and converts the detected phase difference into a distance.

The lidar apparatus 1000 may include a memory configured to store programs and data necessary for the calculation operation of the signal processor 1700.

The calculation result of the signal processor 1700, that is, information about the phase and position of the object OBJ, may be transmitted to another unit. For example, the information may be transmitted to a driving controller of an autonomous driver employing the lidar apparatus 1000, a warning system, or the like.

Since the lidar apparatus 1000 may be used as a sensor configured to acquire three-dimensional information about a forward object in real time, the lidar apparatus 1000 may be applied to an autonomous driver, for example, an unmanned vehicle, an autonomous vehicle, a robot, a drone, and the like. The lidar apparatus 1000 may also be applied to, in addition to the autonomous driver, a black box so as to determine front and rear obstacles at night when it is difficult to identify an object by using only an image sensor.

The light modulating device may vary a phase change width of incident light at a fast response speed by employing a variable resistance material layer that has a plurality of resistance states depending on a voltage applied thereto and has a refractive index changing according to each resistance state.

The light modulating device may form a desired phase profile by employing a two-dimensional array structure, thereby exhibiting any of various optical performances.

The light modulating device may be employed in any of various electronic apparatuses using the optical performances.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light modulating device comprising:
   a metal layer;
   a variable resistance material layer above the metal layer, wherein a resistance of the variable resistance material layer varies depending on a voltage applied thereto;
   a meta surface layer above the variable resistance material layer, the meta surface layer comprising a plurality of conductive nano-antennas having a sub-wavelength dimension; and
   a signal controller configured to apply the voltage between the metal layer and the meta surface layer comprising the plurality of conductive nano-antennas,
   wherein the variable resistance material layer comprises a material that forms a number of conductive nano-filaments in the variable resistance material layer, which varies according to the voltage applied to the variable resistance material layer.

2. The light modulating device of claim 1, wherein the variable resistance material layer directly contacts the metal layer.

3. The light modulating device of claim 1, wherein the plurality of conductive nano-antennas directly contact the variable resistance material layer.

4. A light detection and ranging (LiDAR) apparatus comprising:
   a light source;
   the light modulating device of claim 1, configured to steer light from the light source toward an object; and
   a sensor configured to receive light reflected from the object.

5. The light modulating device of claim 1, wherein the material of the variable resistance material layer comprises $MO_x$, where M is Ni, Ta, Ni, Hf, Fe, W, Mn, or Co and x is real number.

6. The light modulating device of claim 5, wherein a low resistance region comprising M and a high resistance region comprising $MO_x$ are formed in the variable resistance material layer by a voltage applied thereto.

7. The light modulating device of claim 6, wherein the signal controller is further configured to adjust the voltage that is applied between the metal layer and the meta surface layer to increase an area of the low resistance region comprising M and to decrease an area of the high resistance region comprising $MO_x$, in the variable resistance material layer.

8. The light modulating device of claim 1, wherein the metal layer comprises a plurality of metal lines which extend, lengthwise, in a first direction and are repeatedly arranged and spaced apart from each other in a second direction intersecting the first direction.

9. The light modulating device of claim 8, wherein the plurality of conductive nano-antennas are two-dimensionally arranged in the first direction and the second direction, and
   wherein the conductive nano-antennas adjacent to each other in the second direction, from among the plurality of conductive nano-antennas, are connected to each other and are repeatedly arranged and spaced apart from each other in the first direction, to form a plurality of conductive nano-antenna lines.

10. The light modulating device of claim 9, wherein the variable resistance material layer is partitioned into a plurality of pixels two-dimensionally arranged and spaced apart from each other in the first direction and the second direction, and
    wherein the plurality of pixels are arranged at positions at which the plurality of metal lines and the plurality of conductive nano-antenna lines intersect with each other.

11. The light modulating device of claim 10, further comprising:
    a first signal controller configured to control an electrical signal applied to each of the plurality of metal lines; and
    a second signal controller configured to control an electrical signal applied to each of the plurality of conductive nano-antenna lines.

12. The light modulating device of claim 1, wherein the meta surface layer comprises:
    a conductive material layer; and
    a plurality of dielectric nano-antennas above the conductive material layer and having a sub-wavelength dimension.

13. The light modulating device of claim 12, wherein the conductive material layer directly contacts the variable resistance material layer.

14. The light modulating device of claim 12, wherein the metal layer comprises a plurality of metal lines that extend, lengthwise, in a first direction and are repeatedly arranged and spaced apart from each other in a second direction intersecting with the first direction.

15. The light modulating device of claim 14, wherein the conductive material layer comprises a plurality of conductive lines that extend, lengthwise, in the second direction and are repeatedly arranged and spaced apart from each other in the first direction.

16. The light modulating device of claim 15, wherein the variable resistance material layer is partitioned into a plurality of pixels two-dimensionally arranged and spaced apart from each other in the first direction and the second direction, and wherein the plurality of pixels are arranged at positions at which the plurality of metal lines and the plurality of conductive lines intersect with each other.

17. The light modulating device of claim 16, further comprising:

a first signal controller configured to control an electrical signal applied to each of the plurality of metal lines; and a second signal controller configured to control an electrical signal applied to each of the plurality of conductive lines.

* * * * *